Aug. 6, 1935.  J. B. ELFRING  2,010,354
LUBRICATING MECHANISM FOR MACHINE TOOLS
Filed June 30, 1932  2 Sheets-Sheet 1
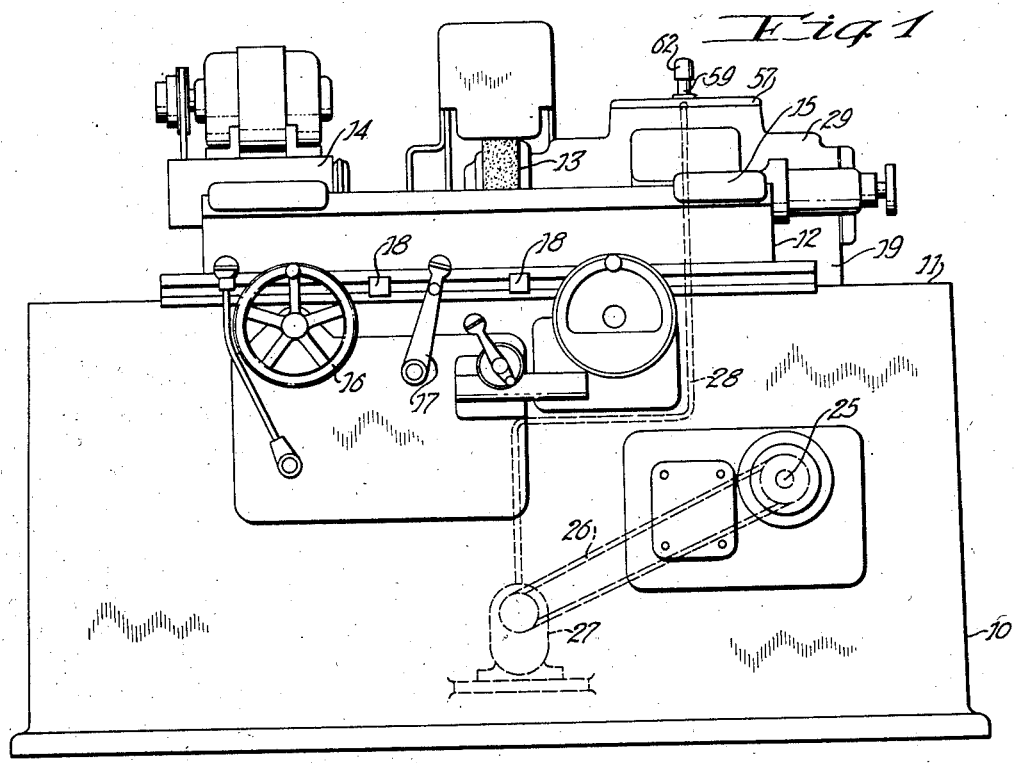
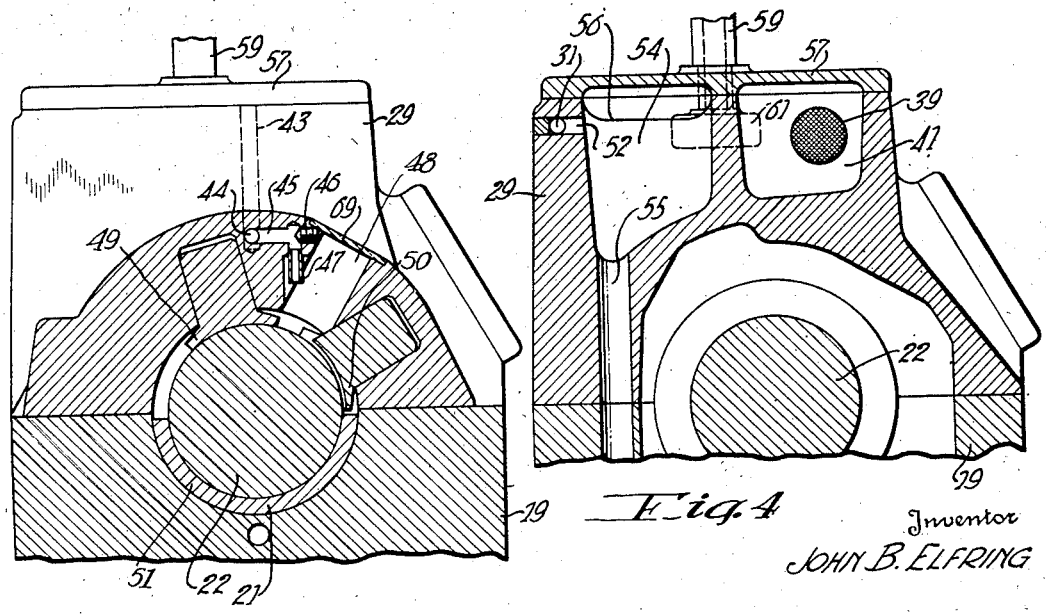
Inventor
JOHN B. ELFRING
By H. K. Parsons
Attorney

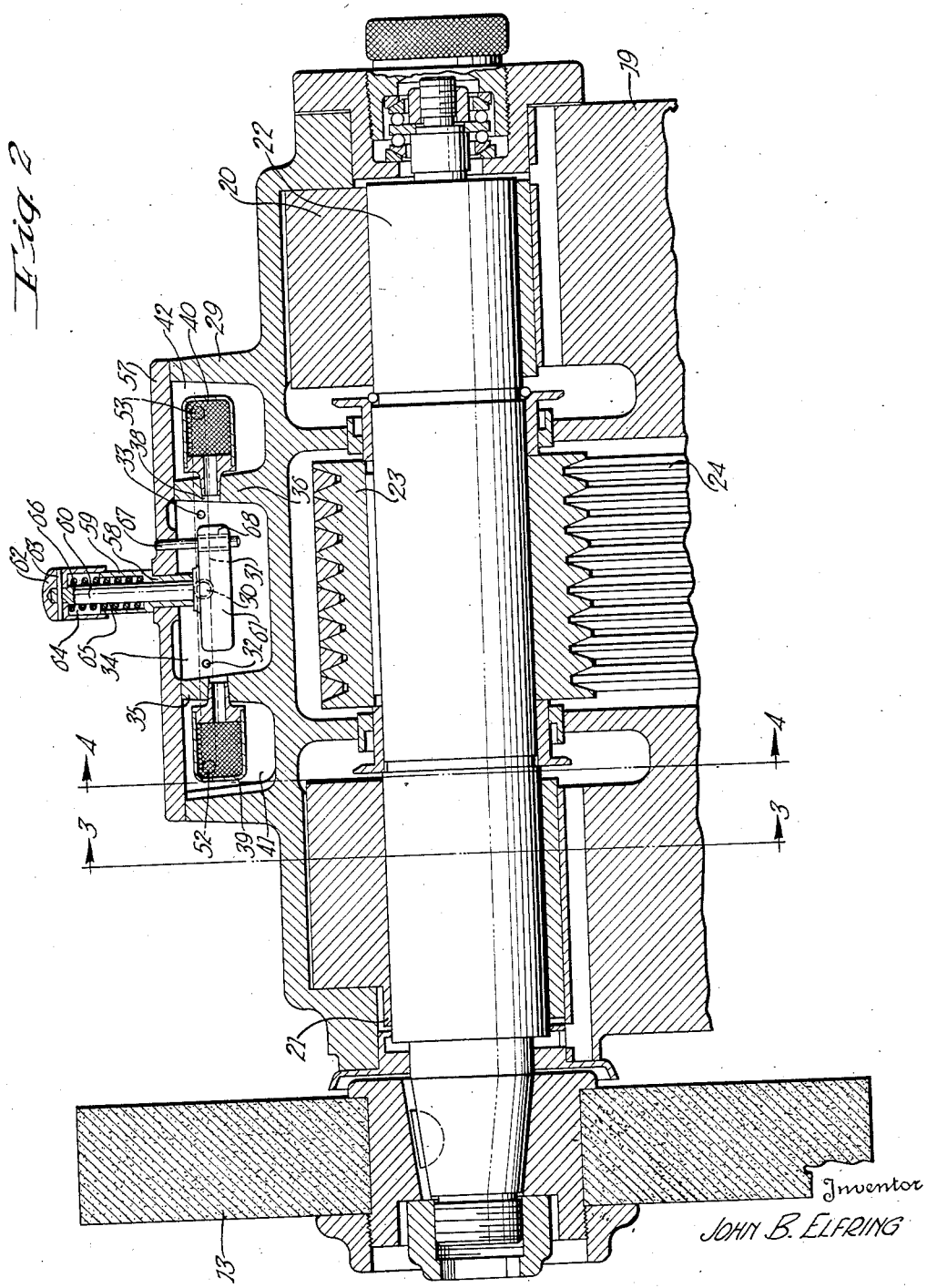

Patented Aug. 6, 1935

2,010,354

UNITED STATES PATENT OFFICE 2,010,354

LUBRICATING MECHANISM FOR MACHINE TOOLS

John B. Elfring, Cincinnati, Ohio, assignor to Cincinnati Grinders Incorporated, Cincinnati, Ohio, a corporation of Ohio Application June 30, 1932, Serial No. 620,201

11 Claims. (Cl. 184—6)

This invention relates to improvements in machine tool organizations and especially to mechanisms for lubricating parts or portions thereof.

An object of the invention is the provision of an improved lubricating system which will facilitate proper lubrication of the bearings of a machine tool or the like under all conditions and will make possible the prevention of operation of the machine, either initially or otherwise, without due and proper lubrication of the parts.

A further object of the present invention is the provision in connection with a force feed lubrication system for machine tool or like use of auxiliary mechanism capable of supplementing the action of the primary lubricant supplying mechanism in effecting desired lubrication of the bearings.

An additional object of the present invention is the provision of means particularly adapted for utilization in satisfactorily conditioning the bearings of a machine as respects lubrication thereof prior to the starting up of the machine and its automatic lubricating devices.

Other objects and advantages of the present invention should be readily apparent by reference to the following specification considered in conjunction with the accompanying drawings forming a part thereof and it is to be understood that any modifications may be made in the exact structural details there shown and described within the scope of the appended claims without departing from or exceeding the spirit of the invention.

In the drawings:

Figure 1 is an elevational view of a grinding machine embodying the improvements of this invention.

Figure 2 is a longitudinal sectional view through the spindle or shaft supporting the tool, here shown as a grinding wheel.

Figure 3 is a transverse sectional view through the spindle and its housing as seen, for example, on line 3—3 on Figure 2.

Figure 4 is a transverse sectional view similar to Figure 3 but through a plane parallel to but spaced therefrom, as seen from line 4—4 on Figure 2.

Throughout the several views of the drawings similar reference characters are employed to denote the same or similar parts.

While this invention is illustrated in the drawings as used with a center type grinding machine it is to be understood that it has equal applications to all other types of machine tools, as well as other uses in which a high speed rotating shaft is intermittently started, that is after a comparatively long delay, such as in the morning after the night's shut down or other times, in which the normal lubricating system has had an opportunity to drain back to the sump or tank. As was noted above, this invention pertains to a device whereby a given quantity of lubricant is supplied to the bearings of a stationary shaft preparatory to its rotation so that the bearing does not seize the shaft or spindle within a short time after initiating the rotation of said shaft or spindle. It is to be understood that as soon as the parts are in normal running condition the normal lubricating supply system is adequate to care for the lubricating needs of the shaft or spindle and its bearings.

The machine illustrated in the drawings comprises a support or bed 10 having formed on the upper surface thereof suitable guideways 11 for guiding during the traversing movement a table 12 which supports a work piece for moving same relative to a tool or grinding wheel 13. The work piece is normally supported between opposed head and tail stocks 14 and 15 adjustably secured to the bed 10 in the usual manner. Any suitable or desirable power and manual means may be employed for effecting the relative movement of the table 12 relative to the bed 10, as is well known to anyone versed in the grinding machine art. The manual means may conveniently terminate in the hand wheel 16, while the power means terminates in the reversing lever 17 operable by the dogs 18 secured to the forward edge of the bed 10.

As is usual the bed 10 has projecting from the rear thereof an extending portion having formed thereon guideways for a carriage 19. The carriage 19 provides at opposite ends thereof bearings 20 and 21 in which is journaled a spindle 22, to the forward end of which is secured the grinding wheel 13 for rotation therewith. Intermediate the ends of the spindle it has secured thereto a pulley or sheave 23 about which is trained suitable flexible transmission means here shown as of the multiple V-belt type 24 received in correspondingly shaped grooves formed circumferentially of the sheave 23. The belts 24 are in turn journaled about a sheave similar to the sheave 23 secured to a jack shaft or the like carried by the bed 10 interiorly thereof as is the usual practice. This jack shaft may be operatively coupled with a suitable countershaft 25 to which is connected, by the usual or accepted transmission means, a prime mover or other source of power. The countershaft 25 is connected by a belt or the like 26 with a pump 27 provided in the rear of the bed 10 and adapted to circulate a suitable lubricating medium through a pipe or the like 28 terminating in the upper casting or head 29 of the carriage 19.

As shown in Figure 2, the pipe 28 feeds a transverse pipe or conduit 30 formed in the casting or head 29 which in turn connects with a longitudinal port 31 extending in substantially the same direction as the axis of the spindle 22. This port 31 has outlets 32 and 33 into a chamber 34 formed in the casting 29 above the sheave 23. The chamber 34 has its side walls 35 and 36 pierced by perforations 37 and 38 into which is respectively secured the open ends of filters 39 and 40. The filters 39 and 40 are respectively enclosed within chambers 41 and 42 formed in the casting 29 on opposite ends of the central chamber 34. As seen in Figure 3, each of the chambers 41 and 42 have depending from it a port or duct 43 connecting by way of longitudinal port or duct 44 with a transverse duct 45 closed on one end by a screw valve 46 for controlling the flow of lubricant to the bearings. Extending downwardly from the duct 45 is the nozzle 47 which extends into the passageway 48 projecting radially from the spindle 22 to the exterior of casting 29. The spindle 22 is surrounded by means of bearing shoes 49, 50 and 51, the latter two being spaced from one another at a point beneath the nozzle 47 to receive the lubricant as it passes from the said nozzle. The shoes are so shaped at this point to take up the lubricant and evenly distribute it along the bearing portions 21 and 22 of the spindle to thereby properly lubricate said spindle and bearings.

The longitudinal oil channel 31 terminates in outwardly projecting ducts 52 and 53, each of which enters into a chamber such as 54 positioned immediately behind the chambers 41 and 42. The chamber 54 has extending therefrom the enlarged channel 55 that terminates in the sump or tank from which the lubricant is drawn by the pump 27. The walls 35 and 36 in addition to separating the chambers 41 and 42 from the chamber 34 also separate the chambers 54 from the chamber 34. These walls are, however, undercut as indicated at 56 in Figure 4, so that any excess lubricant within the chamber 34 may spill over into the chambers 54 to the ducts 55 for return to the tank or sump. From the foregoing it will be noted that the bearings 20 and 21 are amply lubricated once the pump is started and kept in continuous operation. From the foregoing it will also be noted that all of the lubricant being utilized by the bearings must pass through the filters 39 and 40 before delivery to said bearings and that all excess lubricant supplied by the pump is returned to the tank or sump prior to passage through the filters.

It is to be understood that during the operation of the machine the lubricant flows by gravity out of the chambers 41 through conduits 43, 44, 45 and 47 to the spindle bearings and that when operation of the machine is discontinued the lubricant will drain from the chambers to the bearings, temporarily collecting there. If the machine remains out of operation for a considerable period of time however, as for example when shut down over night or over the week-end, there is the possibility that the collected lubricant may gradually drain out of the bearing areas, leaving these in a relatively dry condition with the attendant possibility of their over-heating and seizing when the machine is first started up and before an adequate amount of lubricant has been supplied thereto by the lubricating pump. To eliminate the possibility of this condition arising and to enable the operator to lubricate the bearings initially and independently of the circulation of oil effected by the pump 27, I have provided certain improved auxiliary mechanism, which will now be described.

The cap 57 that covers the several chambers in the casting 29 has secured therein centrally of the chamber 34 a sleeve 58 having the reduced portion thereof extending through the cap and an enlarged portion 59 above the cap. Passing through the sleeve 58 is a plunger 60 pinned or otherwise secured to a comparatively large head 61 disposed within the chamber 34. Secured to the upper end of the plunger 60 is a knob 62 secured as by a pin 63. The knob 62 has a relatively large counterbore 64 adapted to telescope on the enlarged portion 59 of the sleeve 58. Encircling the plunger 60 and disposed interiorly of the counterbore 64 and counterbore 65, within the enlarged portion 59 of the sleeve, is a spring 66 abutting at opposite ends on the seats respectively provided by the counterbores 64 and 65. The expansion of the spring 66 normally urges the knob 62 outwardly causing the head 61 to engage the projecting reduced end of the sleeve 58. Also carried by the cap 57 interiorly of the chamber 34 is a guide pin 67 passing through a suitable perforation 68 formed in the head 61 and acting to guide the pin in its movement relative to the chamber 34 and to prevent any inadvertent rotation of the head 61. It will be noted that the major portion of the height of the head 61 is above the line joining the lowermost points of the filter perforations 37 and 38 so that but a little of the lubricant is displaced from the chamber 34 by the normal position of the head 61.

In the operation of the mechanism prior to the starting of the machine the operator may manually engage the knob 62 for depressing the plunger 60 against the resistance of the spring 66 to cause the head 61 to displace a quantity of lubricant substantially equal to the cubical content of the head. This displacement of the lubricant causes same to flow through the perforations 37 and 38 into and through the filters 39 and 40 to the ports 43 for delivery by the nozzles 47 to the bearing shoes 50 and 51 which distribute the oil to the bearings immediately upon rotation of the shaft or spindle so that no opportunity is afforded for heating the bearings and spindle and causing a failure thereof.

In order to insure the proper displacement of the lubricant within the chamber 34 by the head 61 and to insure a substantially continuous flow of the lubricant to the bearings until the operation of the pump 27 and to prevent the plunger being immediately raised by the spring 66, means are provided for limiting the rate of movement of the head 61 by the said spring. This is caused by properly interfitting the enlarged portion 59 of the sleeve 58 within the counterbore 64 of the knob 62 so that the chamber within the counterbore 64 is throttled to the reception of air which can only be received through the passage formed between the sleeve and knob. In other words, a throttled or restricted passage is provided by the wall of the counterbore 64 and the wall of the enlarged portion 59 of the sleeve 58 which limits the amount of air drawn into the counterbore 64 and thereby effects a relatively slow rise in the head 61 by the spring 66. This time elapse between the compression and expansion of the spring 66 is sufficient to permit the pump 27 to be operated at its maximum speed and have the lubricating system functioning in a proper and desired manner.

In order to apprise the operator of the amount of lubricant that is being supplied to the passage 48, above referred to, it is covered by a suitable window 69 through which the flow of the lubricant from the nozzle 47 may be observed.

It will be understood that while the present invention has been primarily described as utilized in connection with a purely gravity fed lubricating system in which the auxiliary oil supply is fed to the bearings only through displacement thereof within the reservoir, that the basic inventive principles contemplate its utilization in any manner in which an auxiliary supply of oil is delivered to the bearings, and that the member 61 and enclosing chamber 34 might be related in the form of a piston and cylinder such that a positive ejection or delivery of the auxiliary supply of oil to the bearings would be effected, or that other structural modifications may be made therein so long as the primary intended result of effecting an auxiliary supply of lubricant to the bearings either independent of or supplemental to the amount, if any, being at the moment delivered by the normal lubricating system.

What is claimed is:

1. In a mechanism for lubricating the spindles of a machine tool organization the combination of a housing having bearings formed therein, a spindle journaled in said bearing, a lubricant well in the housing above the bearings, lubricant chambers adjacent said well, ports extending from the chambers to the bearings for supplying lubricant by gravity to the bearings, filter means between the lubricant well and lubricant chamber to filter the lubricant before it is supplied to the bearings, power actuated means for supplying lubricant to the well, and additional means for discharging a quantity of lubricant from the well into the chambers.

2. In a mechanism for lubricating the spindles of a machine tool organization the combination of a housing having bearings formed therein, a spindle journaled in said bearing, a lubricant well in the housing above the bearings, lubricant chambers adjacent said well, ports extending from the chambers to the bearings for supplying lubricant by gravity to the bearings, filter means between the lubricant well and lubricant chamber to filter the lubricant before it is supplied to the bearings, power actuated means for supplying lubricant to the well, additional means for discharging a quantity of lubricant from the well into the chambers, and valve means in the ports from the lubricant chambers to the bearings.

3. In a mechanism for lubricating the spindle bearings of a machine tool organization the combination of a housing having a bearing therein, a spindle rotatably journaled in said bearing, a lubricant well formed in the housing above the bearing, a lubricant chamber adjacent the well, ports for supplying the lubricant from the chamber by gravity to the bearing, overflow means between the well and chamber whereby a definite quantity of lubricant is at all times trapped in the well, and means for discharging the trapped lubricant from the well into the chamber.

4. In a mechanism for lubricating the spindle bearings of a machine tool organization the combination of a housing having a bearing therein, a spindle rotatably journaled in said bearing, a lubricant well formed in the housing above the bearing, a lubricant chamber adjacent the well, ports for supplying the lubricant from the chamber by gravity to the bearing, overflow means between the well and chamber whereby a definite quantity of lubricant is at all times trapped in the well, means for discharging the trapped lubricant from the well into the chamber, and additional means for supplying lubricant to the well and through the overflow means to the chamber and bearing.

5. In a mechanism for supplying lubricant to the spindle bearings of a machine tool organization the combination of a housing having bearings therein, a spindle rotatably journaled in the bearings, a lubricant well formed in the housing above the bearings, lubricant chambers adjacent the well for supplying lubricant by gravity to the bearings, overflow means between the well and chambers whereby lubricant is supplied to the chambers from the well, and a certain amount of lubricant is at all times trapped in the well, lubricant circulating means for circulating the lubricant through the well, chambers and bearings, and means for displacing the trapped lubricant in the well to the chambers prior to the operation of the circulating means.

6. In a mechanism for supplying lubricant to the spindle bearings of a machine tool organization the combination of a housing having bearings therein, a spindle rotatably journaled in the bearings, a lubricant well formed in the housing above the bearings, lubricant chambers adjacent the well for supplying lubricant by gravity to the bearings, overflow means between the well and chambers whereby lubricant is supplied to the chambers from the well, and a certain amount of lubricant is at all times trapped in the well, lubricant circulating means for circulating the lubricant through the well, chambers and bearings, means for displacing the trapped lubricant in the well to the chambers prior to the operation of the circulating means, said means for displacing the trapped lubricant comprising a head normally disposed above the level of the trapped lubricant, and a manually actuable plunger for shifting said head from its normal position into the trapped lubricant.

7. In a mechanism for supplying lubricant to the spindle bearings of a machine tool organization the combination of a housing having bearings therein, a spindle rotatably journaled in the bearings, a lubricant well formed in the housing above the bearings, lubricant chambers adjacent the well for supplying lubricant by gravity to the bearings, overflow means between the well and chambers whereby lubricant is supplied to the chambers from the well, and a certain amount of lubricant is at all times trapped in the well, lubricant circulating means for circulating the lubricant through the well, chambers and bearings, means for displacing the trapped lubricant in the well to the chambers prior to the operation of the circulating means, said means for displacing the trapped lubricant comprising a head normally disposed above the level of the trapped lubricant, a manually actuable plunger for shifting said head from its normal position into the trapped lubricant, yielding means for returning the head to its initial position above the lubricant level, and means for retarding the return movement of the head to afford a time interval in which the normal lubricant circulating means may be operated.

8. In a mechanism for supplying lubricant to the spindle bearings of a machine tool organization the combination of a housing having bearings therein, a spindle rotatably journaled in the bearings, a lubricant well formed in the housing above the bearings, lubricant chambers adjacent the well for supplying lubricant by gravity to the bearings, overflow means between the well and chambers whereby lubricant is supplied to the chambers from the well, and a certain amount of lubricant is at all times trapped in the well, lubricant circulating means for circulating the lubricant through the well, chambers and bearings, means for displacing the trapped lubricant in the well to the chambers prior to the operation of the circulating means, said means for displacing the trapped lubricant comprising a head normally disposed above the level of the trapped lubricant, a manually actuable plunger for shifting said head from its normal position into the trapped lubricant, yielding means for returning the head to its initial position above the lubricant level, means for retarding the return movement of the head to afford a time interval in which the normal lubricant circulating means may be operated, and valve means in the ports between the lubricant chambers and bearings to control the amount of lubricant to the bearings.

9. In a mechanism for lubricating the bearings of a rotatable shaft the combination of a housing, bearings in said housing, a shaft rotatably journaled in the bearings, a lubricant well formed in the housing above the bearings, ports formed in the housing for supplying lubricant by gravity to the bearings, the well having an overflow whereby the lubricant is supplied from the well to the ports and the bearings and whereby a definite quantity of lubricant is at all times trapped in the well, lubricant circulating means for normally circulating the lubricant through the well, ports and bearings, and means having a normal position operable for effecting the discharge of said trapped lubricant from the well to the bearing ports before the normal lubricant circulating means is operated.

10. In a mechanism for lubricating the bearings of a rotatable shaft the combination of a housing, bearings in said housing, a shaft rotatably journaled in the bearings, a lubricant well formed in the housing above the bearings, ports formed in the housing for supplying lubricant by gravity to the bearings, the well having an overflow whereby the lubricant is supplied from the well to the ports and the bearings and whereby a definite quantity of lubricant is at all times trapped in the well, lubricant circulating means for normally circulating the lubricant through the well, ports and bearings, means having a normal position operable for effecting the discharge of said trapped lubricant from the well to the bearing ports before the normal lubricant circulating means is operated, means for returning the said last mentioned means to its normal position, and means to retard the operation of said returning means to effect a time interval in which the normal circulating means is operated.

11. In a mechanism for lubricating the bearings of a rotatable shaft the combination of a housing, bearings in said housing, a shaft rotatably journaled in the bearings, a lubricant well formed in the housing above the bearings, ports formed in the housing for supplying lubricant by gravity to the bearings, the well having an overflow whereby the lubricant is supplied from the well to the ports and the bearings and whereby a definite quantity of lubricant is at all times trapped in the well, lubricant circulating means for normally circulating the lubricant through the well, ports and bearings, means having a normal position operable for effecting the discharge of said trapped lubricant from the well to the bearing ports before the normal lubricant circulating means is operated, means for returning the said last mentioned means to its normal position, means to retard the operation of said returning means to effect a time interval in which the normal circulating means is operated, and valve means in the ports between the lubricant chambers and bearings to control the amount of lubricant to the bearings.

JOHN B. ELFRING.